(12) United States Patent
Bao et al.

(10) Patent No.: US 9,099,135 B1
(45) Date of Patent: Aug. 4, 2015

(54) DETERMINING TRACK DENSITY CAPABILITY IN A STORAGE DEVICE

(71) Applicant: Seagate Technology LLC, Cupertino, CA (US)

(72) Inventors: HaoJi Bao, Singapore (SG); Aigang Feng, Singapore (SG); Myint Ngwe, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/644,343

(22) Filed: Mar. 11, 2015

(51) Int. Cl.
  *G11B 5/596* (2006.01)

(52) U.S. Cl.
  CPC ............ *G11B 5/59627* (2013.01); *G11B 5/596* (2013.01); *G11B 5/59683* (2013.01); *G11B 5/59688* (2013.01)

(58) Field of Classification Search
  CPC .. G11B 5/59688; G11B 19/045; G11B 5/596; G11B 5/012; G11B 5/59627; G11B 5/5534; G11B 5/59683; G11B 21/106
  USPC ....................................... 360/77.4, 31, 77.02
  See application file for complete search history.

(56) References Cited

U.S. PATENT DOCUMENTS

| | | | |
|---|---|---|---|
| 5,825,578 A * | 10/1998 | Shrinkle et al. | 360/77.08 |
| 6,035,351 A * | 3/2000 | Billings et al. | 710/74 |
| 6,940,679 B1 * | 9/2005 | McNeil et al. | 360/77.04 |
| 7,046,471 B2 | 5/2006 | Meyer et al. | |
| 7,705,588 B2 | 4/2010 | Eaton et al. | |
| 7,916,421 B1 * | 3/2011 | Liikanen et al. | 360/77.01 |
| 8,102,613 B2 | 1/2012 | Duan et al. | |
| 8,325,434 B2 | 12/2012 | Namkoong et al. | |
| 8,736,995 B1 | 5/2014 | Wiesen et al. | |
| 8,755,142 B2 * | 6/2014 | Grobis et al. | 360/77.01 |
| 2013/0238834 A1 | 9/2013 | Feldman et al. | |
| 2013/0342931 A1 * | 12/2013 | Grobis et al. | 360/77.02 |

* cited by examiner

*Primary Examiner* — Ali Neyzari
(74) *Attorney, Agent, or Firm* — Mueting, Raasch & Gebhardt, P.A.

(57) ABSTRACT

Methods including determining a distribution of a position error signal (PES) of a magnetoresistive head by obtaining PES data from a servo controller associated with the magnetoresistive head; determining an encroachment function of a storage disc; and determining a track density of the storage disc by considering both the PES distribution and the encroachment function.

19 Claims, 13 Drawing Sheets

DETERMINING TRACK DENSITY CAPABILITY IN A STORAGE DEVICE

SUMMARY

Disclosed are methods for calculating the maximum track density of a storage disc having an associated magnetoresistive head, the method including determining a distribution of a position error signal (PES) of the magnetoresistive head, (A(x)); determining an encroachment function (D(x)) of the storage disc; and determining a maximum track density (t) by solving equation 1 below:

$$Y(t) = 10,000 \times \int_{t-3\sigma}^{t+3\sigma} [A(x) \times D(x)] dx \leq 1. \quad (1)$$

Also disclosed are storage devices that include a storage disc having a plurality of zones including a plurality of tracks with the number of tracks in the storage disc being defined by a track density calculated by: determining a distribution of a position error signal (PES) of a transducer, (A(x)); determining an encroachment function (D(x)) of the storage disc; and determining the track density (t) by solving:

$$Y(t) = 10,000 \times \int_{t-3\sigma}^{t+3\sigma} [A(x) \times D(x)] dx \leq 1.$$

Further disclosed are methods including determining a distribution of a position error signal (PES) of a magnetoresistive head by obtaining PES data from a servo controller associated with the magnetoresistive head; determining an encroachment function of a magnetic storage disc; and determining a track density of the magnetic storage disc by considering both the PES distribution and the encroachment function.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

During certification of hard disc drives, variable bit aspect ratio (VBAR) is utilized to determine the drive's areal density capability (ADC) as well as its reliability performance. There are various methods for VBAR tuning VBAR tuning includes two parts, bits per inch (BPI) and tracks per inch (TPI) tuning TPI is sometimes considered more important as it dominates adjacent track interference (ATI) performance. TPI is generally difficult to estimate.

Typical methods of TPI tuning create a stressed condition during the certification process to simulate a drive's ATI performance in the field. One method includes testing the ability to survive 10,000 adjacent track writes without the occurrence of a failure. Time and efficiency considerations make it impractical to actually test 10,000 writes at each TPI configuration however. As such, more reasonable conditions are sought to recreate or represent such stressed conditions. Some such conditions are created using various techniques from channel or servo, such as reduced channel iteration, increased channel noise boost, voice coil motor (VCM) noise, or combinations thereof. The thought is to equate the placebo conditions to the real drive ATI in the field so that the TPI that is selected can sustain the real world situations. Nevertheless, this is feasible only when the fabricated stressed condition can reasonably and reproducibly correlate with the real situation, which is an impossible task as real ATI conditions are bound to vary, given different head/zone or drive configurations.

Figure 1:
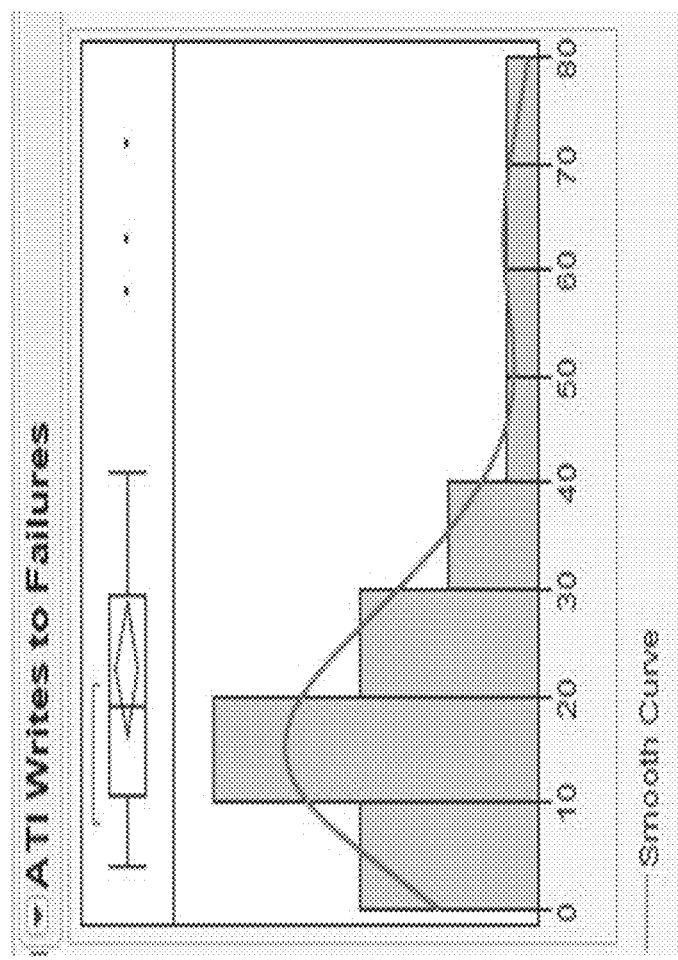
FIG. 1 shows adjacent track interference (ATI) performance (writes to failure) for a random group of magnetic storage devices.
Figure 2:
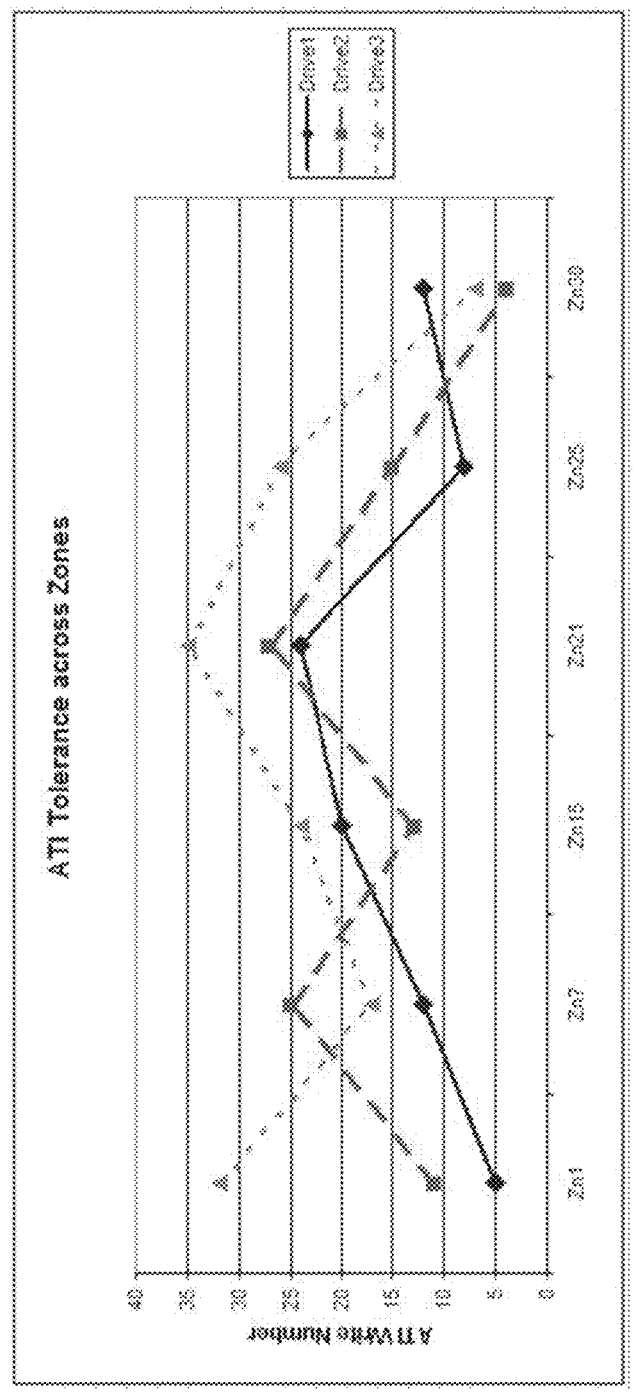
FIG. 2 shows ATI performance of a single magnetic storage device across the different zones of the magnetic storage disc for three different devices.

As a result of these issues, ATI performance of a batch of randomly picked drives put through the same conditions, differs to a large extent, as seen in FIG. 1. Furthermore, ATI performance of the same drive across different zones varies too, as seen in FIG. 2. The results seen in FIGS. 1 and 2 show that one universal setting is not sufficient for TPI tuning. Therefore, new methods of determining TPI are necessary. Disclosed herein are therefore methods of determining the TPI of an element, for example a track or a zone based on intrinsic information of the disc.

Disclosed herein are predictive TPI tuning methods based on intrinsic conditions of the drive at given locations. Disclosed methods link TPI tuning to conditions such as in-situ servo position error signal (PES), bits in error (BIE) and sector failure rate (SFR) for example. In contrast to conventional TPI tuning methods, disclosed methods do not require frequent calibration of tuning parameters to verify that the correlation to real field ATI has been maintained whenever a component change in the drive development cycle has occurred. Disclosed methods may also improve tuning accuracy, and saves test time as no progressive testing is required at each and every TPI trial.

Disclosed methods of determining track density of a disc consider both effects of the magnetic head and the disc. More specifically, both write position differences and encroachment effectiveness differences are considered. Disclosed herein are methods of determining track density of a magnetic storage disc or disc that is associated with one or more magnetoresistive head(s). Disclosed methods can generally include steps of determining input to the track density from the magnetic head(s) positioning, determining input to the track density from variability in the magnetic disc itself (track, zone, etc.), determining the effect of one track encroaching on another, and deciding on a track density of the magnetic disc based on those inputs.

In some embodiments, disclosed methods can determine the ATI tolerance, or how many writes can be done on an adjacent track before the track of interest fails to read back properly. ATI tolerance can then be utilized to determine the TPI. ATI tolerance can be quantified by considering at least two parameters, where the head writes (e.g., MR offset) and how effective (or how severe) it writes. Disclosed methods can therefore include steps of determining where the head writes, determining how effectively the head writes and formulating an effect on ATI tolerance based thereon.

Figure 3:
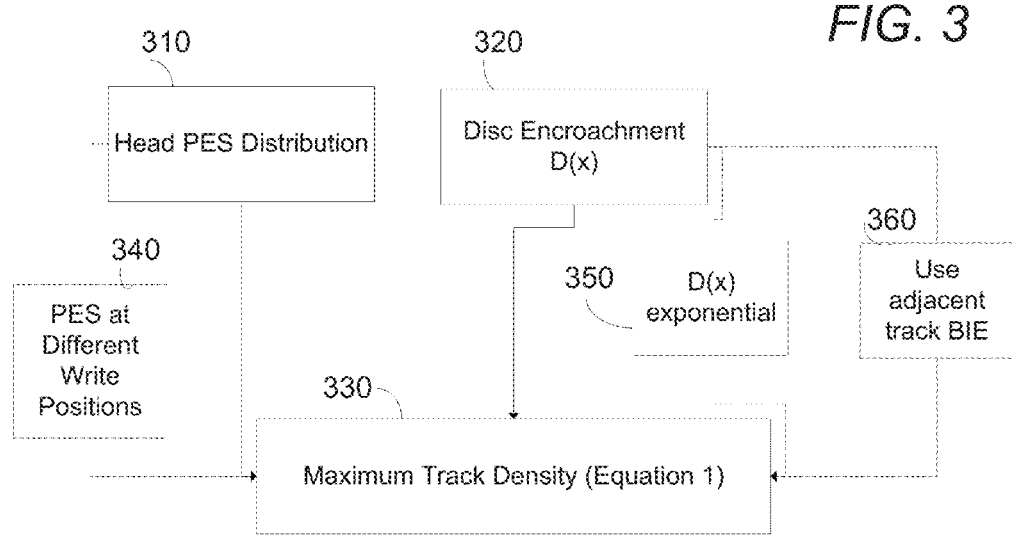
FIG. 3 is a flowchart illustrating disclosed methods.

Disclosed methods can more specifically be described as including at least: defining a distribution of the position error signal (PES) of the magnetoresistive head; defining an encroachment function of the magnetic storage disc or portion thereof; and determining a track density by considering the distribution of the PES and the encroachment function. FIG. 3 presents a flowchart depicting disclosed methods and includes step 310 determining head distribution, step 320, determining disc encroachment, e.g. D(x), and step 330 determining a track density, for example a maximum track density.

One step in disclosed methods includes defining a distribution of the PES. Such steps can include use of PES data. PES is generally generated in order to identify the amount of track misregistration (TMR) at a given time and to provide correction inputs to bring the transducer back into desired alignment with a given track. TMR errors can arise from a number of factors, including operational aspects of the recording subsystem or the servo-mechanical control system. TMR can also arise from external effects, such as through the application of externally generated vibration to a device.

PES data for a transducer or head can be measured, or it can be obtained from the system in which the magnetoresistive head/disc is being operated or tested. In some embodiments, a read/write channel associated with the head can demodulate the embedded servo sectors to detect the radial location of the head, and a PES can be generated as the difference between the detected location of the head and a target location (centerline of the target track). In some embodiments, the PES can be generated from the embedded servo data.

In some embodiments, PES data can be obtained at different write positions. This optional step is depicted in FIG. 3 as step 340. The obtained PES data for a magnetoresistive head can then be fit to a mathematical model. Generally, the model that is fit to the PES data can be designated as A(x), where x is the position on the disc. Illustrative mathematical models, or more specifically, what A can be, depends on the particular PES data set. Any mathematical model that fits particular PES data can be utilized. In some embodiments, the PES data can best fit a normal distribution, for example. PES data that can be represented by a normal distribution can be represented by N (μ,σ) where μ is the mean value and σ is the deviation. In some embodiments, the PES data can best be fit to a binomial distribution, which can be represented by B (n,p) where n is the number of PES data points and p is the probability function. Mathematical models besides normal and binomial distributions can also be utilized herein.

The description of the PES data, for example a particular mathematical formula can be derived offline based on obtained PES data or it can be determined on the fly (or in-situ) for each test head, or zone.

Figure 4:
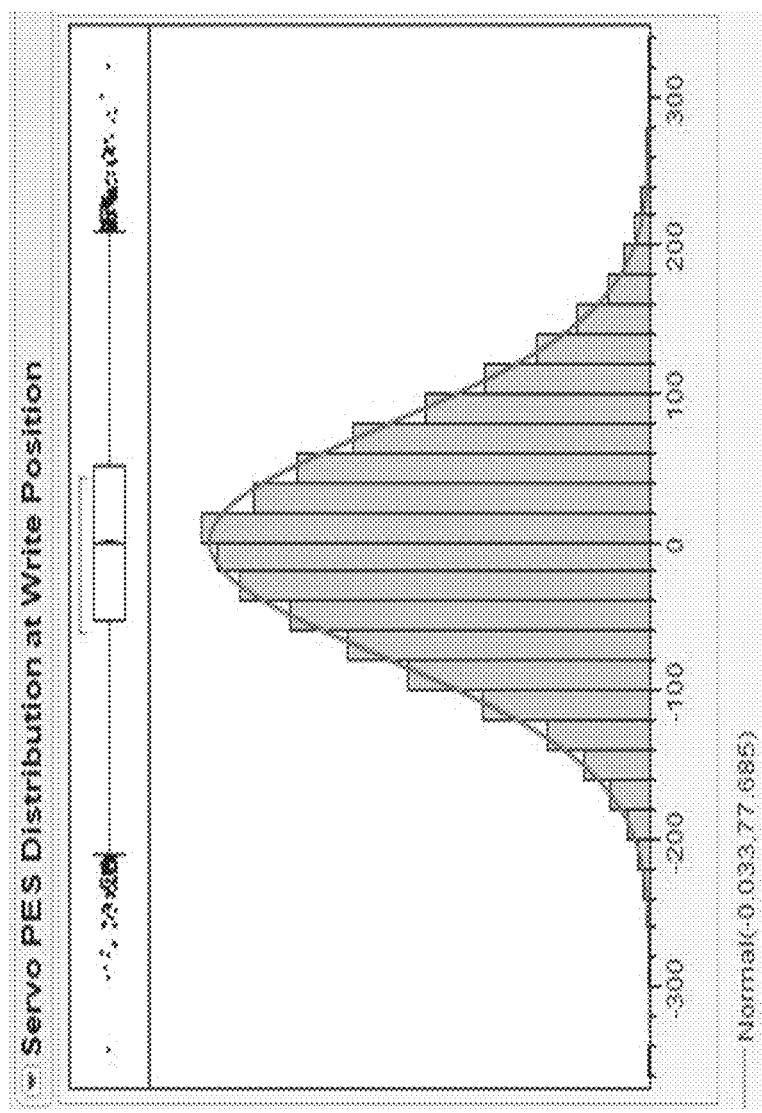
FIG. 4 shows position error signal (PES) data versus the write position.

FIG. 4 shows PES data obtained for 10,000 writes at various write positions. This particular set of PES data can be modeled by a normal distribution with a mean value (μ) and sigma (σ), so that the normal distribution is denoted by N (μ, σ). The model shows that not all of the 10,000 writes have the same amount of off-track discrepancy. The probability of a particular write follows a bell shaped curve as seen in FIG. 4 for this particular set of data.

Another step in disclosed methods includes obtaining or determining the input from the disc. More specifically, this step can be described as including or determining an encroachment function. This step is shown in FIG. 3 as step 320. In some embodiments, a known description of the encroachment can be utilized. For example, the encroachment can be characterized by a pre-determined description, such as by an exponential function. The optional step of characterizing the encroachment function as an exponential function is shown in FIG. 3 as step 350. In some embodiments the encroachment can be determined by gathering data. Alternatively, or in addition, a description of encroachment determined by gathering data or a pre-determined description can be verified, adjusted, or both via collection of data.

In embodiments where data is gathered, the data can include data related to bits in error (BIE). BIE can be captured when adjacent tracks are written to at different off-track positions. Such data can be measured or it can be obtained from the system in which the magnetoresistive head/disc is being operated or tested. In some embodiments, systems in which the magnetoresistive head/disc are being operated or tested may include methods and processes for capturing such data. For example, there may be firmware commands to capture BIEs whenever the command is invoked. Alternatively, the BIE can be retrieved by reading channel registers.

BIE data can be gathered when writing to an adjacent track at different off track positions. This optional step is depicted in FIG. 3 as step 360. Once data at different off track positions has been gathered, trend lines can be plotted from the data. In some embodiments, the data can be fit with lines, for example linear lines. Each trend line represents a different MR offset. The geometric offset of the write and read head elements is generally referred to as the MR offset of the MR head. Manifestation of the MR offset is usually seen magnetically and is termed the write-to-read (W/R) offset of the MR head. The terms MR offset and W/R offset are often used interchangeably, and for the purposes of this disclosure, the generally accepted reference of MR offset is used throughout.

Figure 5:
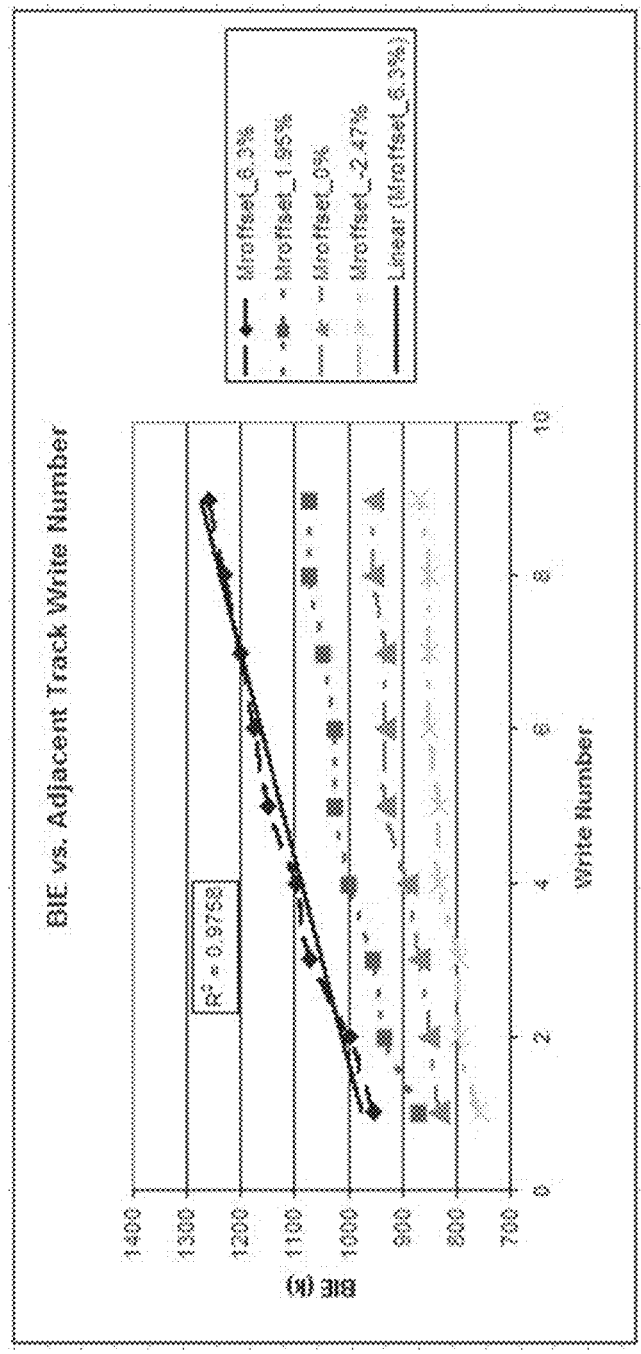
FIG. 5 shows the bits in error (BIE) versus the number of adjacent track writes at different MR offsets.

FIG. 5 shows BIE data for different MR offsets (6.3%, 1.95%, 0%, −2.47%) plotted against number of adjacent track writes at different off track positions. The line for each MR offset is generally linear and is fairly well correlated ($R^2$ often greater than 0.95). In some embodiments, BIE data can be gathered differently. In some embodiments, gathered BIE data may provide different functions (e.g., not necessarily linear).

In methods that include the optional step of BIE data collection (e.g., step 360 in FIG. 3), another step can include determining (or verifying, adjusting, or both) an encroachment function based on the BIE data. An equation that describes the BIE data can be utilized in order to estimate the number of writes that would be required at a given MR offset to reach a target BIE, which can ultimately lead to an encroachment function. In some embodiments, an encroachment function can be determined by, for example obtaining a trend line for gathered BIE data versus number of writes at a given MR offset; estimating a number of writes at a given MR offset to reach a target BIE; plot estimated writes versus off-track position, which in some embodiments yields an exponential function; and obtain an encroachment function (D(x)) which is the reciprocal of that exponential function. It should be noted that plotting the estimate writes versus off-track position may be obtained by obtaining a plurality of trend lines at different MR offsets and estimating the number of writes (at each) to obtain a target BIE. The more MR offsets are utilized, the better the data can be fit, for example with an exponential function, which ultimately may provide a better definition of the encroachment function. In some embodiments where data is collected, at least five (5) different MR offsets can be utilized, or in some embodiments at least seven (7) different MR offsets can be utilized. In some particular embodiments, nine (9) MR offsets can be utilized.

Figure 6:
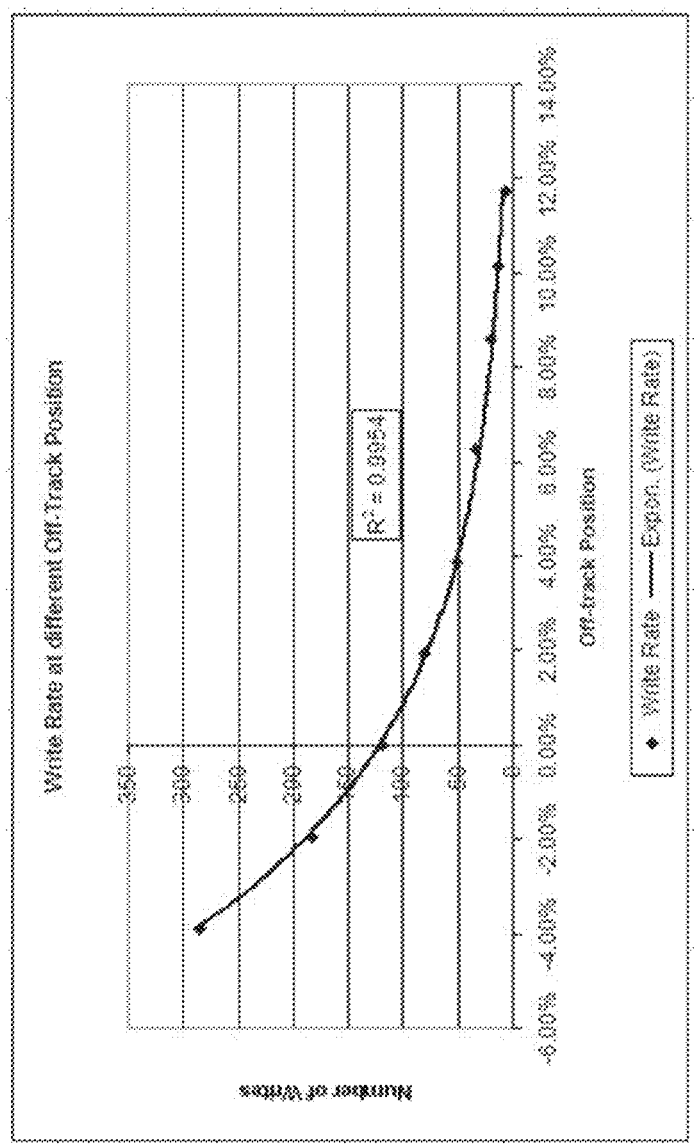
FIG. 6 shows the exponential fit for write rates at different off-track positions.

In some embodiments, the BIE data can be fit with linear trend lines (it should also be noted again, that other mathematical functions can be utilized to fit the BIE data), and from those trend lines, the number of writes required at a given MR offset to reach a target BIE can be estimated. An illustration of estimated writes plotted versus the MR offset can be seen in FIG. 6. The data seen there can be fit with an exponential function (for example) that has a relatively high correlation ($R^2$=0.9954). The reciprocal of the fitted function of FIG. 6 can be defined as a function of encroachment rate, which can be denoted D(x). The particular data that led to FIG. 6 was derived from only ten (10) writes, instead of 10,000. However, even with a limited data set, it can be seen that the encroachment effect at different MR offsets can be best described by an exponential function and it only differs in scale and power rate.

Another step in disclosed methods includes determining a track density (represented by step 330 in FIG. 3). Disclosed methods can also be described as obtaining a difference in TPI from an already chosen or defined TPI. In some embodiments, a track density can be determined in part by modeling the adjacent track interference (ATI) effect. In some embodiments, the net ATI effect (Y) can be represented by equation (1):

$$Y(x) = \int_{t-\sigma}^{t+\sigma} [A(x) \times D(x)]dx \qquad (1)$$

In equation 1, A(x) describes the PES data as a function of off-track position (x); D(x) describes the encroachment rate as a function of off-track position (x). By utilizing the description of the PES data (normal, bimodal, etc.) and the description of the encroachment rate (which may be determined or further refined via the collection of BIE data), the net effect on ATI can be determined.

The net ATI effect can then be utilized to determine, for example the maximum TPI that the particular tested element (e.g., particular track, particular zone of tracks, particular disc containing multiple zones containing multiple tracks) can support. One particular way of determining a maximum TPI from the net ATI effect is to normalize the encroachment of 10,000 ATI writes. This method is mathematically shown by equation (2):

$$Y(t) = 10,000 \times \int_{t-3\sigma}^{t+3\sigma} [A(x) \times D(x)]dx \leq 1. \qquad (2)$$

The inequality represented by equation 2 can be solved to determine the maximum TPI that the tested element can support.

Figure 7:
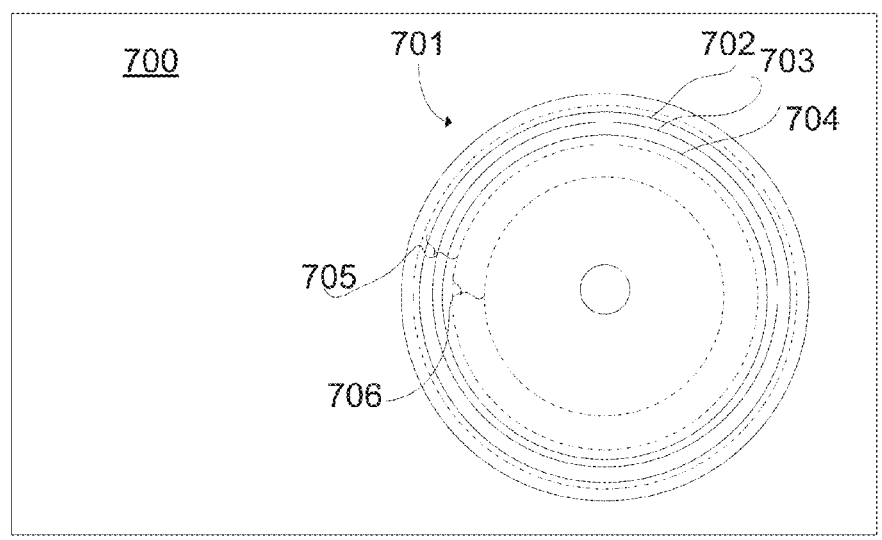
FIG. 7 shows an illustrative storage device disclosed herein.

Disclosed methods can be carried out once or more for each magnetoresistive head in a storage device, once or more for each storage disc in a storage device, once or more for every zone of each storage disc, once or more for every track in each zone of each storage disc, or any combination thereof. FIG. 7 shows a storage device 700 (e.g., a magnetic storage device) that includes a storage disc 701. The storage disc 701 (e.g., a magnetic storage disc) can include a plurality of tracks, illustrated by tracks 702, 703 and 704. The plurality of tracks can be arranged into zones, illustrated by zones 705 and 706.

In some embodiments, where the robustness of the track density being determined is at a premium, the method can be carried out on each track of each storage disc within a magnetic storage device. In some embodiments, where the reduction of testing time and complexity is at a premium, the method can be carried out only once on each head of the storage device. In some embodiments, the robustness of the method and the required time and complexity can be weighed against each other in order to decide upon the level at which the method will be carried out. In some embodiments, a disclosed method can be carried out on each zone of each storage disc. In some embodiments, a disclosed method can be carried out on a zone of a storage disc and the PES distribution and encroachment function of that zone can be utilized as a starting point for the adjacent zone. In some embodiments, a disclosed method can be carried out on a first zone, the PES distribution and encroachment function from that first zone can be applied to an adjacent second zone and the applicability of the PES distribution and encroachment function from the first zone to the second zone can be verified, if the PES distribution and encroachment function from the first zone is applicable to the second zone the track density prediction from the first zone can be utilized for the second zone, if the PES distribution and encroachment function from the first zone is not applicable to the second zone, the PES distribution and encroachment function can be modified accordingly. Such an iterative process could then be repeated across the entire magnetic storage disc zone by zone (for example).

An example of a disclosed method, using a hard disc drive is illustrated below. The method is carried out and its predictions verified.

Figure 8:
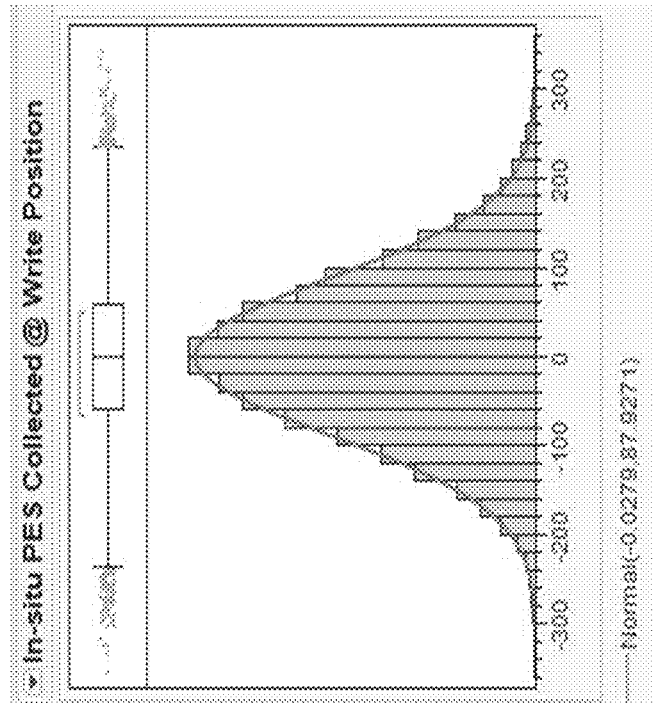
FIG. 8 shows illustrative in situ PES data for 100 revolutions.
Figure 9:
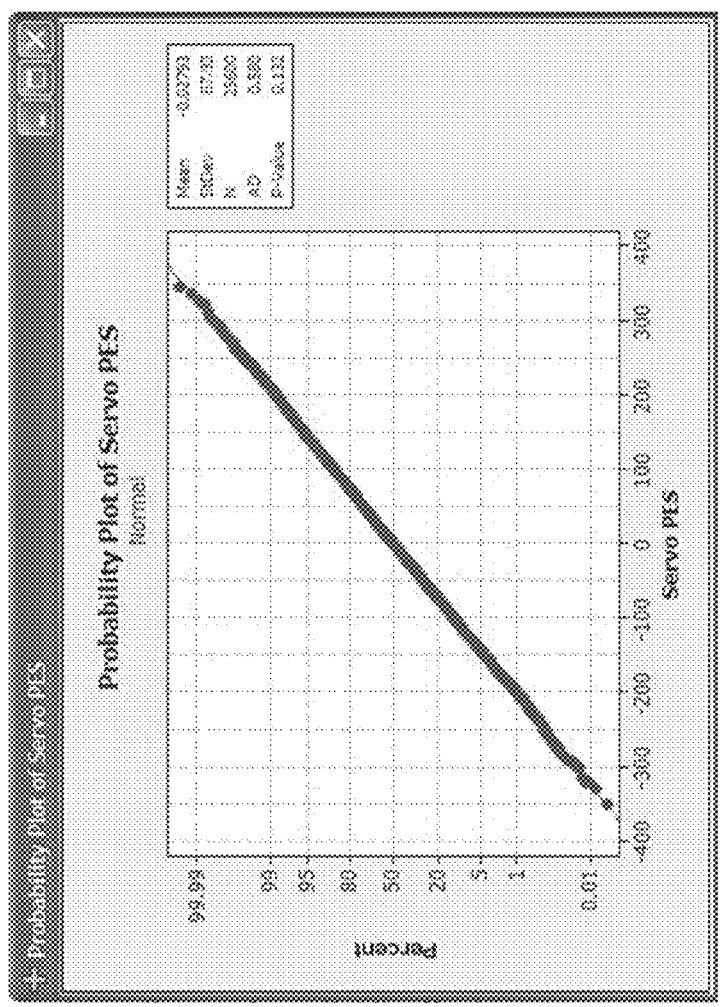
FIG. 9 shows the normality test of the PES data shown in FIG. 6.

At a randomly selected track location, a PES profile of 100 revolutions at writing position was obtained. FIG. 8 shows the PES data as a function of write position. The data is best approximated by a normal function, so that A(x)=N (μ, σ), where x denotes off-track position converted from raw PES values, μ=0, and σ=2.15%. FIG. 9 shows a normality test of the collected PES signals showing the validity of the approximation model.

Figure 10:
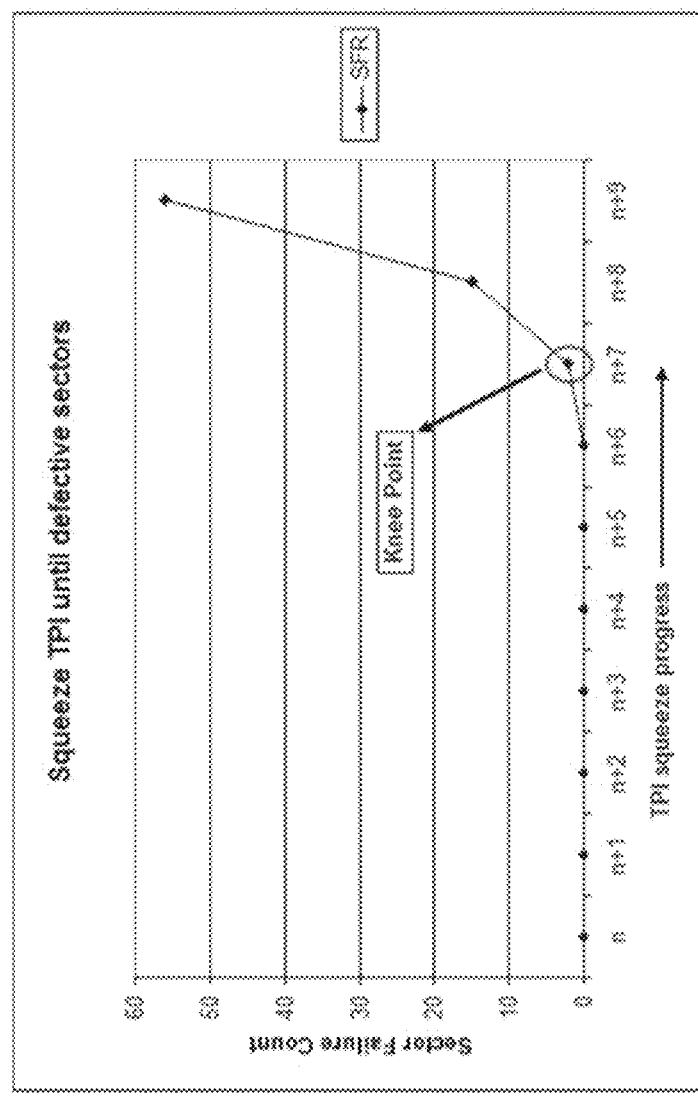
FIG. 10 shows the sector failure rate (SFR) versus the TPI squeeze.

FIG. 10 captures sector failure rate (SFR) of the next track when encroached from the adjacent track at different TPI push values. A single write was done at each TIP squeeze and full channel correction power was used for the readback. The TPI squeeze percentage at which a single write will result in an uncorrectable sector error in the reading track can be referred to as the knee point. In this case, the knee point was 8.74%. The knee point provides a reference point to quantify the net ATI effect. In this example, at 8.74%, the encroachment rate (severity) is 1.0 and thus, all the writes with a MR offset less than 8.74% can be meaningfully given a value following the exponential function of D(x). For this same reason, equation 2 is set to less than 1.0 but not other values.

The encroachment effect was also tested at a relaxed TPI direction by measuring BIEs at different writes, similar to that described with respect to FIG. 5 above. BIEs were found to be insensitive to a sufficient number of writes when placed −16.46% away from existing TPI layout. The encroachment rate at that off-track position was therefore deemed to be converged to 0, or a number significantly small, empirically $10^{-20}$. To identify an encroachment rate function D(x), the equation set given in equation 3 below was solved.

$$\begin{cases} D(8.74\%) = 1 \\ D(-16.46\%) = 10^{-20} \end{cases} \quad (3)$$

Solving equation 3 yielded:

$$D(x) = e^{(182.7448x - 15.9719)} \quad (4).$$

If t is denoted as any TPI deviation from the default layout, the encroachment rate of a 10,000 ATI writes can be normalized and quantified by use of equation (2):

$$Y(t) = 10{,}000 \times \int_{t-3\sigma}^{t+3\sigma} [A(x) \times D(x)] dx \le 1. \quad (2)$$

Maximum t, which can also be described as the TPI capability, can be obtained by solving the inequality. Numerical values can be substituted into equation 2 and it can then be reduced to equation 5:

$$Y(t) = 1.468 \int_{32.889(t-3\sigma-8.45\%)}^{32.889(t+3\sigma-8.45\%)} e^{-x^2} dx. \quad (5)$$

Figure 11:
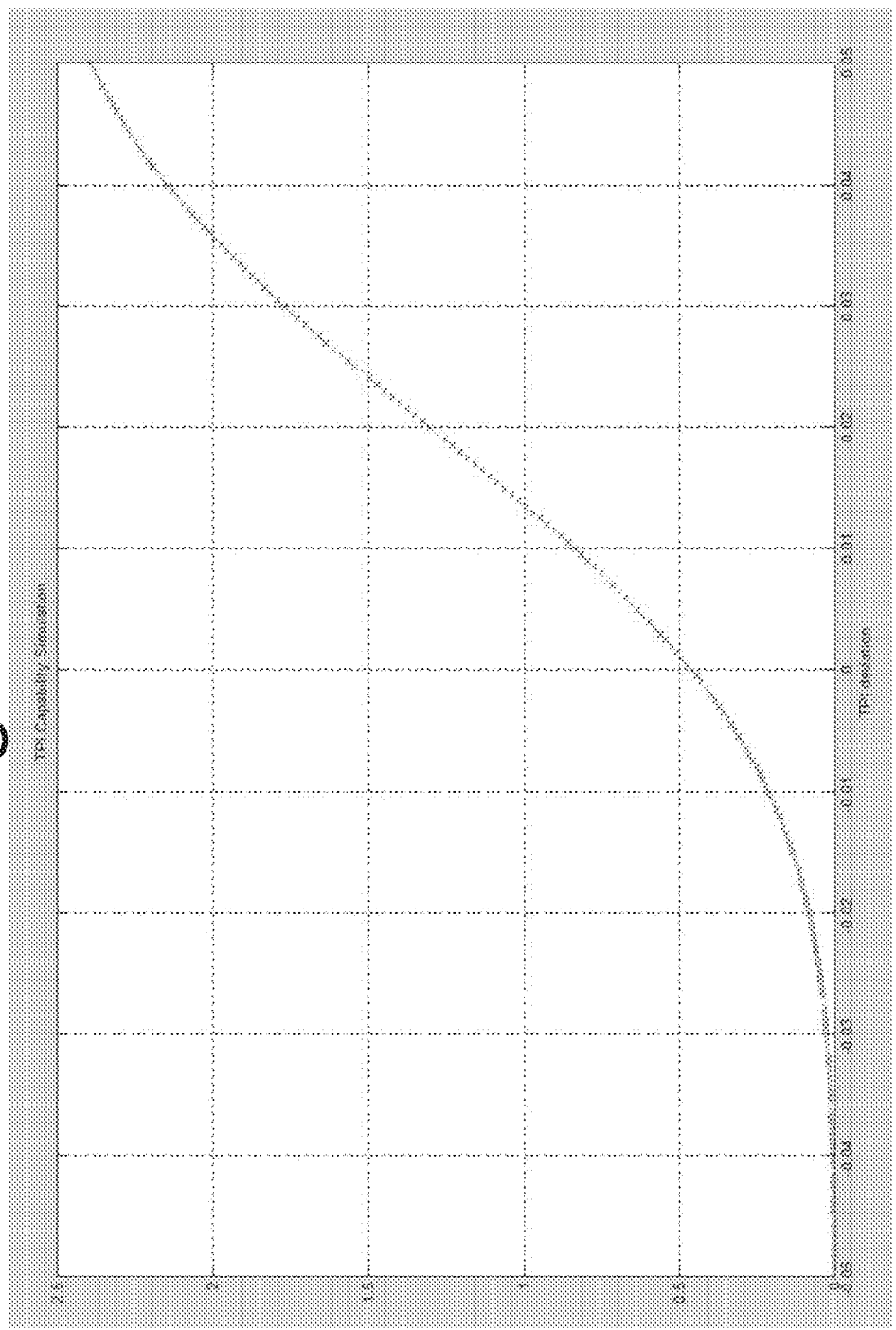
FIG. 11 shows simulation results of TPI deviation (t) from −5% to 5% at steps of 0.05%.

Equation 5 is a Gaussian error function and no elementary function is given. A Taylor expansion could be used to solve, or alternatively, e can be assumed to be 2.718 and then a simulation where t is scanned from −5% to 5% in a step of 0.05% can be ran. Results from such a simulation are seen in FIG. 11. From this simulation, the maximum t can be determined. As seen from FIG. 11, the predicted maximum TPI is about 1.3% higher than the current value of the disc on which the results were obtained. This implies that a loss of ADC would have been realized because the default TPI was underestimated.

Figure 12:
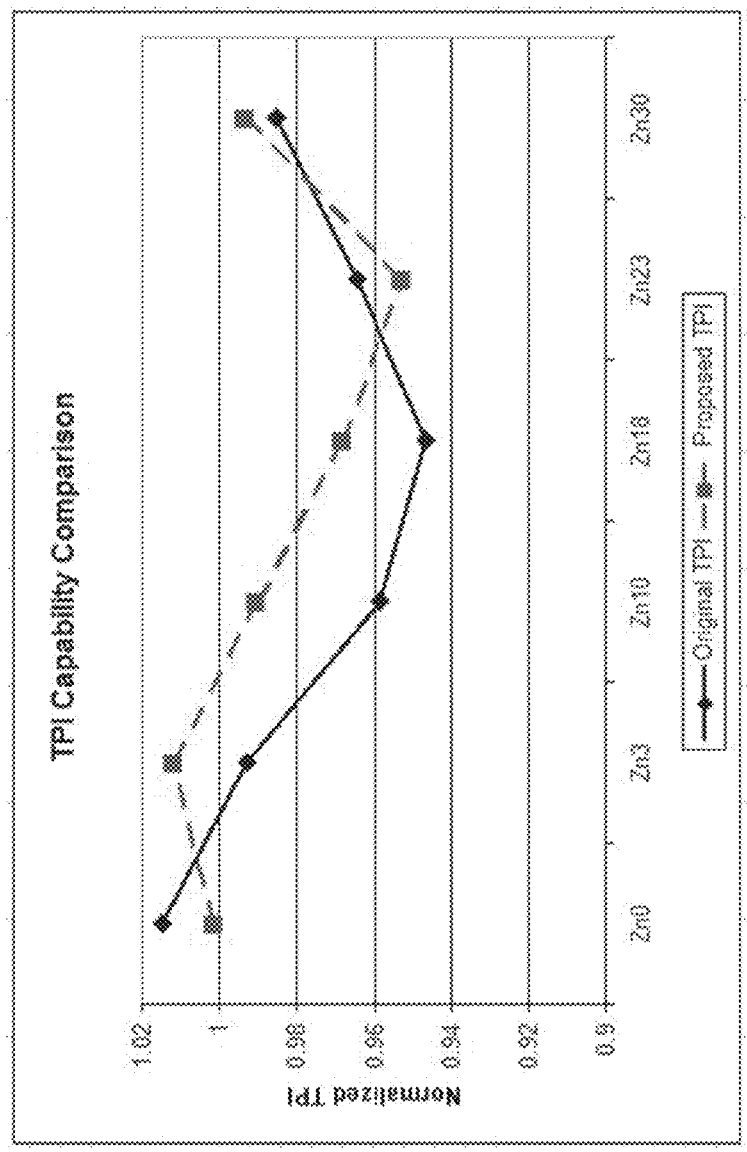
FIG. 12 shows the original TPI and predicted TPI, versus zone of a magnetic storage device.
Figure 13:
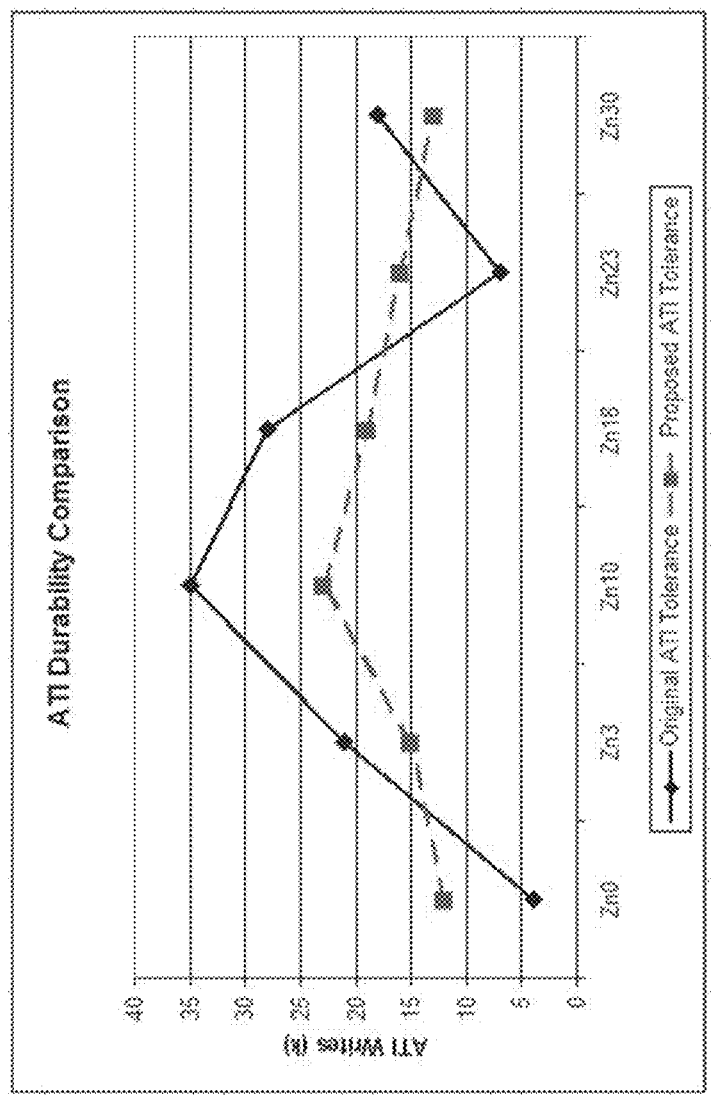
FIG. 13 shows the original ATI and predicted ATI, versus zone of a magnetic storage device.

Other locations on the same drives were tested and those locations were subjected to the same method detailed above. The results are shown in FIGS. 12 and 13. FIG. 12 shows both the original TPI and the TPI determined using this method normalized versus zones. FIG. 13 shows the ATI tolerance for both the original TPI and the TPI determined using this method. As seen, the ATI performance across zones tends to be much less diversified and more close to the actual requirement. Yet, the net ADC, defined by the product of BPI and TPI, gains by 0.93%. This is likely due to unification of ATI durability of different zones so that more bits can be packed into a disc.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

Thus, embodiments of determining track density capability in a storage device are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A method for calculating the maximum track density of a storage disc having an associated magnetoresistive head, the method comprising:

determine a distribution of a position error signal (PES) of the magnetoresistive head, (A(x));

determine an encroachment function (D(x)) of the storage disc; and determine a maximum track density (t) by solving equation 1 below:

$$Y(t) = 10{,}000 \times \int_{t-3\sigma}^{t+3\sigma} [A(x) \times D(x)]dx \leq 1. \qquad (1)$$

2. The method according to claim 1, wherein the encroachment function is an exponential function.

3. The method according to claim 1, wherein the encroachment function can be determined by measuring the bits in error (BIE) for a first track by writing to an adjacent track thereof; and determining the encroachment rate function D(x) of the magnetoresistive head based on the measured BIE.

4. The method according to claim 1, wherein the distribution of the PES can be determined by obtaining PES data at different write positions.

5. The method according to claim 1, wherein the distribution of the PES is a normal distribution, N ($\mu$, $\sigma$), where $\mu$ is the mean value and $\sigma$ is the deviation.

6. The method according to claim 1, wherein the distribution of the PES is a binomial distribution, B(n, p), where n is the number of PES data points and p is the probability function.

7. The method according to claim 1, wherein the storage disc comprises a plurality of zones, each of the plurality of zones comprising a plurality of tracks, and wherein the method is carried out for each track of the storage disc.

8. The method according to claim 1, wherein the storage disc comprises a plurality of zones, each of the plurality of zones comprising a plurality of tracks, and wherein the method is carried out for each zone of the storage disc.

9. A storage device comprising:
a storage disc comprising a plurality of zones, each zone comprising a plurality of tracks with the number of tracks in the storage disc being defined by a track density calculated by:
determining a distribution of a position error signal (PES) of a transducer, (A(x));
determining an encroachment function (D(x)) of the storage disc; and
determining the track density (t) by solving:

$$Y(t) = 10{,}000 \times \int_{t-3\sigma}^{t+3\sigma} [A(x) \times D(x)]dx \leq 1.$$

10. The storage device according to claim 9 further comprising a servo controller to control the location of the transducer with respect to the storage disc.

11. The storage device according to claim 10, wherein PES data can be obtained from the servo controller.

12. The storage device according to claim 11, wherein the distribution of the PES can be determined by obtaining PES data from the servo controller at different write positions.

13. The storage device according to claim 9, wherein the distribution of the PES is a normal distribution, N ($\mu$, $\sigma$), where $\mu$ is a mean value and $\sigma$ is a deviation.

14. The storage device according to claim 9, wherein the encroachment function is an exponential function.

15. The storage device according to claim 9, wherein the encroachment function can be determined by measuring bits in error (BIE) for a first track by writing to an adjacent track thereof; and determining the encroachment rate function D(x) of the transducer based on the measured BIE.

16. The storage device according to claim 9, wherein the storage disc comprises a plurality of zones, each of the plurality of zones comprising a plurality of tracks, and wherein the determining steps are carried out for each track of the storage device.

17. The storage device according to claim 9, wherein the storage disc comprises a plurality of zones, each of the plurality of zones comprising a plurality of tracks, and wherein the determining steps are carried out for each zone of the storage device.

18. A method comprising:
determine a distribution of a position error signal (PES) of a magnetoresistive head by obtaining PES data from a servo controller associated with the magnetoresistive head;
determine an encroachment function of a magnetic storage disc; and
determine a track density of the magnetic storage disc by considering both the PES distribution and the encroachment function.

19. The method according to claim 18, wherein the distribution of the PES is a normal function or an exponential function.

\* \* \* \* \*